Nov. 18, 1924.                                    1,516,220
O. M. TUCKER ET AL
METHOD AND APPARATUS FOR DELIVERING VISCOUS GLASS
Original Filed Aug. 12, 1918

Inventors
Oliver M. Tucker
William A. Reeves
By Edwin P. Corbett
Attorney

Patented Nov. 18, 1924.

1,516,220

UNITED STATES PATENT OFFICE.

OLIVER M. TUCKER AND WILLIAM A. REEVES, OF COLUMBUS, OHIO.

METHOD AND APPARATUS FOR DELIVERING VISCOUS GLASS.

Original application filed August 12, 1918, Serial No. 249,421. Divided and this application filed September 23, 1924. Serial No. 739,408.

*To all whom it may concern:*

Be it known that we, OLIVER M. TUCKER, and WILLIAM A. REEVES, citizens of the United States of America, residing at Columbus, in the county of Franklin and State of Ohio, have invented certain new and useful Improvements in Methods and Apparatus for Delivering Viscous Glass, of which the following is a specification.

Our invention relates to a method and apparatus for delivering viscous glass. It has particular reference to such a spout in connection with a glass furnace, being primarily designed to meet certain requirements in the production of en bloc charges preformed as to shape and dimensions and the dropping and settling of such charges right side up in the molds where they are to be further treated.

Others have devised spouts which deliver viscous glass from furnace to mold and others have provided means for heating the glass in such spouts. But, the production of preformed charges and the proper deposit thereof calls for certain accuracies that are only attainable by special measures of control. For instance, glass being delivered through a spout is very liable to develop strata of different temperatures and, if this condition persists in the glass being actually delivered from the delivery orifice of the spout, the charges will frequently curve, because one side is colder than the other or will be otherwise of uneven consistency. Then, the curved charges will not properly settle in their molds while the uneven consistency will prevent proper subsequent treatment, as by blowing thin, etcetera. These are merely examples of numerous defects due to improper temperature control. We have solved a very bothersome problem by first providing a spout which is thoroughly insulated and then equipping such spout with means whereby the temperature of both the spout interior and the glass can be efficiently regulated.

Thus, regardless of variations in furnace conditions, we have devised apparatus making it possible to deliver charges of viscous glass of chosen quantity, quality and uniformity. In this way, we have taken the handling of glass one step further away from formerly existing limitations inherent in the problem of extracting viscous glass from furnaces whose internal conditions are inevitably ever-changing.

This application is a division of our copending application, filed August 12, 1918, Serial No. 249,421, a method and apparatus for delivering viscous glass.

The preferred embodiment of our invention is shown in the accompanying drawings wherein.

The top, bottom, sides and ends of the spout 1 are thoroughly insulated as at 4.

We have provided several means, additional to the insulation, for controlling the internal temperature of the spout and the temperature of the glass at different points in such spout. In the first place, both the channel and the hood of the spout are enlarged at their receiving end, as at 5. This facilitates inlet of the glass and the heat currents from the glass furnace. More important, still, the wide channel for the glass results in slow movement of the glass at this point and it will appear that we utilize this condition for temperature regulation before the glass passes into the heavily insulated narrow channel. Thus, before the glass reaches the delivery orifice where it has a more rapid movement, it has ample time for the heated and chilled strata to diffuse and bring about the delivery of charges of any desired uniform temperature and consistency. From its wide portion, the spout tapers toward its delivery end where it is provided with a valve-controlling draft flue 6 lined with refractory and insulating material and leading out of the top of the spout nose to assist in drawing the heat currents from the furnace through the spout, above and in direct contact with the glass in such spout. Thus the glass passes through the spout with a minimum amount of wall-friction and the heat currents are readily controlled.

Figure 1:
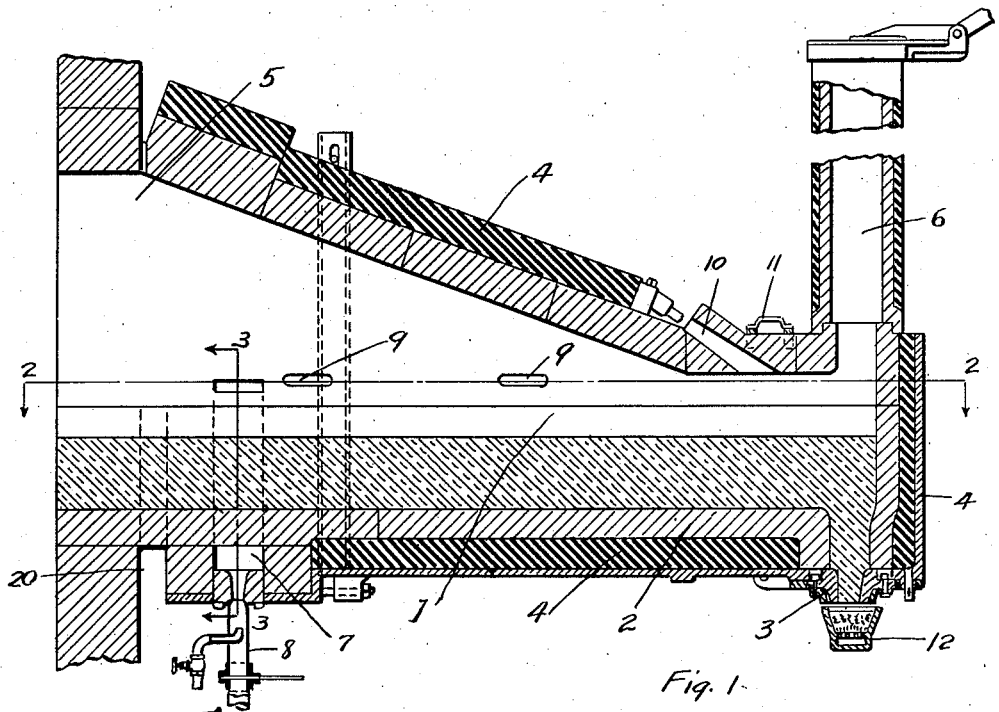
Figure 1 is a longitudinal section of our spout structure, shown applied to a furnace.
Figure 2:
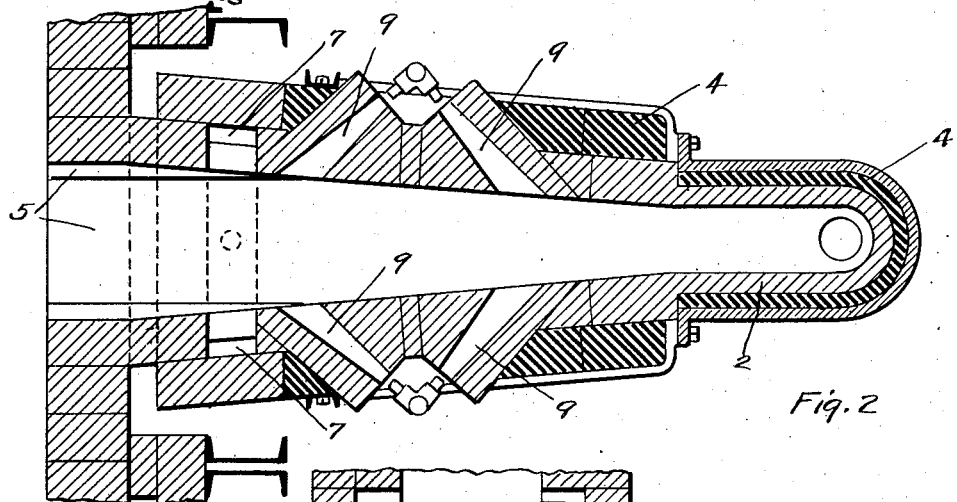
Figure 2 is a section taken on line 2—2 of Figure 1.
Figure 3:
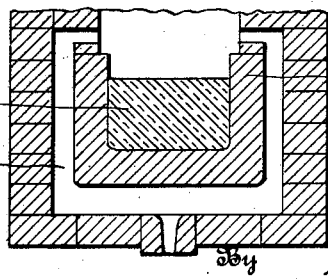
Figure 3 is a partial section, taken on the line 3—3 of Figure 1.

The walls of the spout are provided with a channel which is shown at 7 as extending around three sides of the spout adjacent the juncture of the spout with the furnace and which may be fed with a heating or cooling fluid from below as at 8. In the form shown these channels deliver into the space 5 (Fig. 1) and the heating or cooling fluid, preferably a gas may be so delivered as to commingle with the heat currents from the furnace so as to directly modify the effect of such currents upon the glass and wall surfaces and, in time, to modify the effect of the wall surfaces upon the glass. It will be obvious that the channel 7 may be ramified to various points in the walls of the spout. However, it is an important fact of our invention that we positively influence the temperature of the glass very near the moment when it enters the spout, thereby giving ample opportunity for diffusion of the impressed temperature during the time the glass travels to the delivery orifice.

It is likewise of considerable importance that the outer lining around the channel blocks 2 is spaced from the furnace wall as at 20. This is an important structural feature, due to the fact that there is a tendency for the glass in the furnace to destructively erode and seep through the joints between the furnace wall and the channel blocks. If there is no channel such as the channel 7 in the spout structure, and if there is no space 20, the viscous glass will seep through the furnace wall in between the wall blocks and the channel blocks, and for instance, in a structure such as shown, will seep in between these channel blocks and the outer lining until it reaches the insulation. This very seepage, in itself, will fill up the natural air spaces and thereby decrease the inherent insulating qualities of the spout. What is even more important, however, is the fact that the glass when it comes in contact with the insulating material will eat part of this insulating material away and will form a chemical union with it, with the result that its insulating qualities will be greatly impaired, if not destroyed. In addition, if there is a channel as shown at 7 this tendency would eventually result in filling up the channel 7 with glass and thus rendering it inoperative. But with the space 20, the outer surfaces of the furnace wall and the joints at the points in question are chilled by the atmosphere sufficiently to prevent destructive erosion of the wall blocks and leakage and, even if any slight leakage occurs, the glass will merely drip down onto the floor, since it cannot reach the channel 7.

In addition the spout is provided in its walls, with ports 9 that are preferably oblique and which are so located as to make possible the direct application of heating or cooling blasts to any area above the upper surface of the glass in the spout. Furthermore, there is provided a port 10 in the top of a lid 11 of the spout nose, this port permitting the application of either a heating or cooling blast within such nose and adjacent the delivery orifice. The lid is particularly desirable because it is removable to give ready access to the glass in the spout.

Thus, the temperature of the glass and spout walls at every point is under positive control and this control is so complete that the glass may be brought to the delivery orifice at any desired uniform consistency and at any rate of movement within chosen limits.

In addition, we have a means for intermittently stopping feed of the glass from the delivery orifice of the spout, which means takes the form of a cup 12 movable into and out of closing relation to the bottom end of the spout orifice. When in position, gas under pressure is fed to the cup and burned therein while the cup is closed with the exception of an extremely small outlet for the products of combustion, so that an intense heat is applied to the clay bushing 3.

From this it will be seen that the glass in the spout is subject to complete temperature control, from the moment it enters until it leaves the spout. In our method, these temperature controls are desirably utilized to insure a uniform temperature and rate of movement at the delivery orifice. A large part of the uniformity of temperature and rate of movement is attributable to the insulation upon the spout, for it greatly enhances surety of control, although the various features of control are all important.

Having thus described our invention, what we claim is:

1. A spout for delivering viscous glass from a furnace comprising a channel block, an outer lining for said block, a channel in said lining adjacent the juncture of said spout with the furnace wall, said lining being spaced from the furnace wall to provide a space open to the atmosphere between said lining and the furnace wall.

2. A spout for delivering viscous glass from a furnace comprising a delivery trough with a delivery opening therein, an outer lining for said trough, said lining embodying heat insulating material and being spaced from the furnace wall to provide a space open to the atmosphere between said lining and the furnace wall.

3. A spout for delivering viscous glass from a furnace, comprising a channel block, an outer lining for said block, a channel in said lining adjacent the juncture of said spout with the furnace wall, said lining being spaced from the furnace wall to provide a space open to the atmosphere between said lining and said furnace wall, and said spout being insulated practically throughout from said space to and including the nose of the spout.

4. A spout for delivering viscous glass from a furnace, comprising a channel block, an outer lining for said block, a channel in said lining adjacent the juncture of said spout with the furnace wall, said lining being spaced from the furnace wall to provide a space open to the atmosphere between said lining and said furnace wall, said spout being insulated practically throughout from said space to and including the nose of the spout, and a valve controlled chimney on the spout.

5. A spout for delivering viscous glass from a furnace, comprising a channel formation, an outer lining for said formation, said lining embodying heat insulating material and being spaced from the furnace wall to provide a space open to the atmosphere between said lining and the furnace wall, said spout being insulated practically throughout from said space to and including the nose of the spout.

6. A spout for delivering viscous glass from a furnace, comprising a channel formation, an outer lining for said formation, said lining embodying heat insulating material and being spaced from the furnace wall to provide a space open to the atmosphere between said lining and the furnace wall, said spout being insulated practically throughout from said space to and including the nose of the spout, and a valve controlled chimney on the spout.

7. A spout for delivering viscous glass from a furnace, comprising a channel formation, an outer lining for said channel formation, said lining embodying heat insulating material and being spaced from the furnace wall to provide a space open to the atmosphere between said lining and the furnace wall, and a valve controlled chimney on the spout.

8. A spout for delivering viscous glass from a furnace, comprising a trough with a delivery opening therein, an outer lining for said trough, said lining being spaced from the furnace wall to provide a space open to the atmosphere between said lining and the furnace wall, and openings through said lining leading into said trough above the level of the glass therein for the introduction of a temperature modifying medium to the spout.

In testimony whereof, we hereby affix our signatures.

OLIVER M. TUCKER.
WILLIAM A. REEVES.